(12) United States Patent
Faivre D'Arcier et al.

(10) Patent No.: US 12,485,627 B2
(45) Date of Patent: Dec. 2, 2025

(54) PROPELLER BLADE OR AIRFOIL WITH HOLLOW COMPOSITE ROOT

(71) Applicants: SAFRAN, Paris (FR); SAFRAN AIRCRAFT ENGINES, Paris (FR)

(72) Inventors: Pierre Jean Faivre D'Arcier, Moissy Cramayel (FR); Clément Pierre Postec, Moissy Cramayel (FR); Vincent Lionel René Maison, Moissy Cramayel (FR); Mattéo Minervino, Moissy Cramayel (FR)

(73) Assignees: SAFRAN, Paris (FR); SAFRAN SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/859,818

(22) PCT Filed: Apr. 25, 2023

(86) PCT No.: PCT/FR2023/000054
§ 371 (c)(1),
(2) Date: Oct. 24, 2024

(87) PCT Pub. No.: WO2023/209289
PCT Pub. Date: Nov. 2, 2023

(65) Prior Publication Data
US 2025/0108569 A1     Apr. 3, 2025

(30) Foreign Application Priority Data
Apr. 26, 2022   (FR) .................................... 2203868

(51) Int. Cl.
*B29C 70/24*     (2006.01)
*B29B 11/16*     (2006.01)
(Continued)

(52) U.S. Cl.
CPC .............. *B29C 70/24* (2013.01); *B29C 70/48* (2013.01); *B29C 70/86* (2013.01); *B29L 2031/087* (2013.01)

(58) Field of Classification Search
CPC ......... B29C 70/24; B29C 70/48; B29C 70/86; B29C 70/222; B29C 70/345;
(Continued)

(56) References Cited

U.S. PATENT DOCUMENTS 9,616,629 B2 *   4/2017   Fabre .................... F04D 29/324
10,414,487 B2 *  9/2019   Laurenceau ....... B29D 99/0025
(Continued)

FOREIGN PATENT DOCUMENTS

FR    2 732 406 A1    10/1996
WO    WO 2006/136755 A2    12/2006

OTHER PUBLICATIONS

International Search Report as issued in International Patent Application No. PCT/FR2023/000054, dated Aug. 2, 2023.
(Continued)

*Primary Examiner* — Eric J Zamora Alvarez
(74) *Attorney, Agent, or Firm* — Pillsbury Winthrop Shaw Pittman LLP

(57) ABSTRACT

A propeller blade or airfoil of a turboprop of composite material includes a fibrous reinforcement densified by a matrix, the propeller blade or airfoil including, in a span direction, a root and an aerodynamic profile. The fibrous reinforcement includes a fibrous preform having a three-dimensional weave with a root preform portion present in the root and an aerodynamic preform portion present in the aerodynamic profile, the root and aerodynamic preform portions being linked to one another by the three-dimensional weave. The root preform portion of the fibrous
(Continued)

preform includes an unlinked area delimiting an internal root recess forming a cavity opening at a free end of the root.

11 Claims, 11 Drawing Sheets

(51) Int. Cl.
*B29C 70/48* (2006.01)
*B29C 70/86* (2006.01)
*B29L 31/08* (2006.01)
*B64F 5/10* (2017.01)

(58) Field of Classification Search
CPC ... B29C 70/543; B29C 70/545; B29C 70/682; B29C 70/72; B29C 2793/009; B29C 70/0035; B29C 70/08; B29C 33/52; B29C 33/76; B29B 11/16; F01D 5/282; F01D 21/045; F01D 5/147; F01D 5/141; B29D 99/0025; B29D 99/0028; B64C 11/26; B64C 11/06; B64C 11/18; B64C 11/30; B64C 2027/4736; D03D 25/005; D03D 1/00; D03D 15/275; D03D 11/02; B29L 2031/08; B29L 2031/087; F05D 2300/603; F05D 2220/36; F05D 2220/32; F05D 2230/50; F05D 2300/224; F05D 2300/6012; F05D 2300/6033; F05D 2300/6034; F05D 2300/702; F05D 2300/614; F04D 29/324; F04D 29/322; F05C 2253/04; D10B 2505/02; B64F 5/10

See application file for complete search history.

(56) References Cited

U.S. PATENT DOCUMENTS

| | | | |
|---|---|---|---|
| 11,208,198 B2* | 12/2021 | Courtier | B29C 70/24 |
| 11,767,098 B2* | 9/2023 | Courtier | D03D 11/02 |
| | | | 416/230 |
| 2006/0257260 A1 | 11/2006 | Dambrine et al. | |
| 2013/0017093 A1* | 1/2013 | Coupe | B29B 11/16 |
| | | | 416/230 |
| 2015/0040396 A1 | 2/2015 | Fremont et al. | |
| 2016/0159460 A1* | 6/2016 | Laurenceau | B29D 99/0025 |
| | | | 264/103 |
| 2019/0217943 A1* | 7/2019 | Courtier | B29C 70/545 |
| 2019/0323357 A1* | 10/2019 | Courtier | B64C 11/30 |

OTHER PUBLICATIONS

Written Opinion of the International Searching Authority as issued in International Patent Application No. PCT/FR2023/000054, dated Aug. 2, 2023.

* cited by examiner

[Fig. 1]
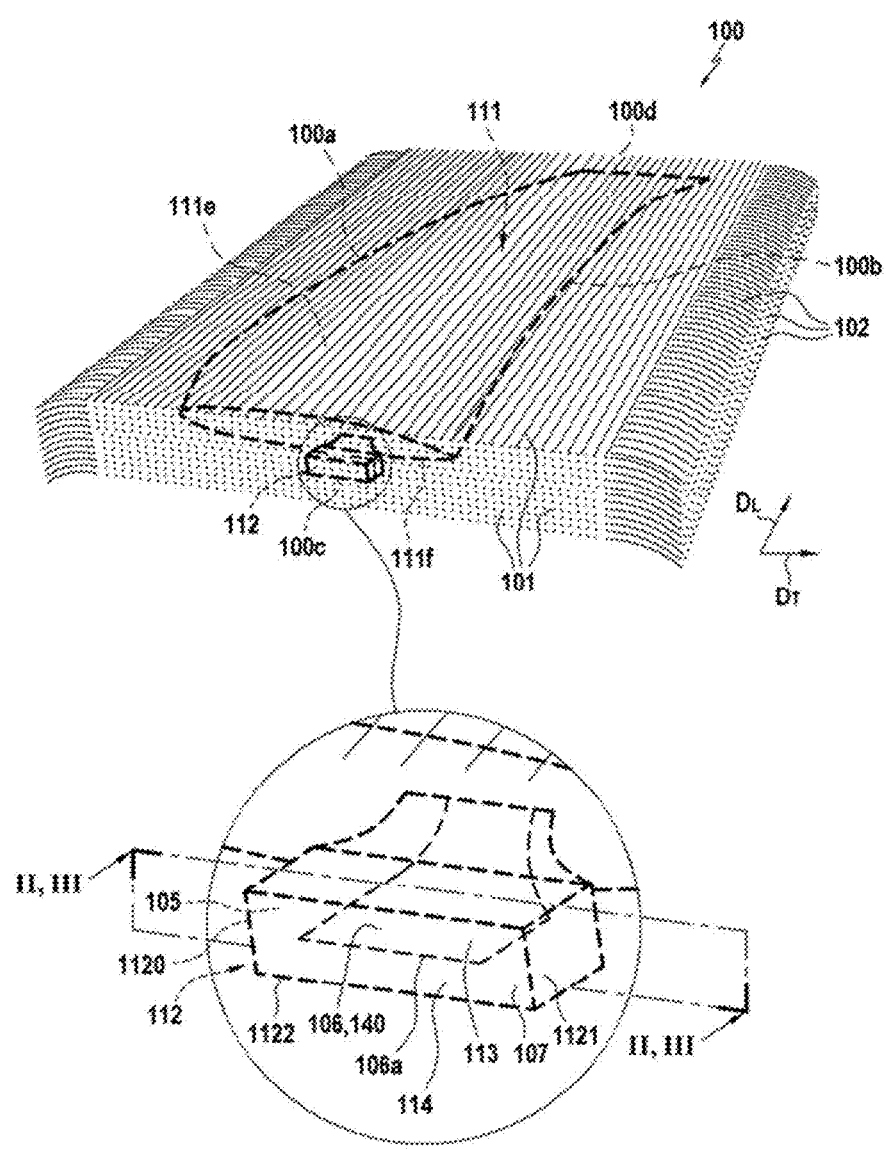

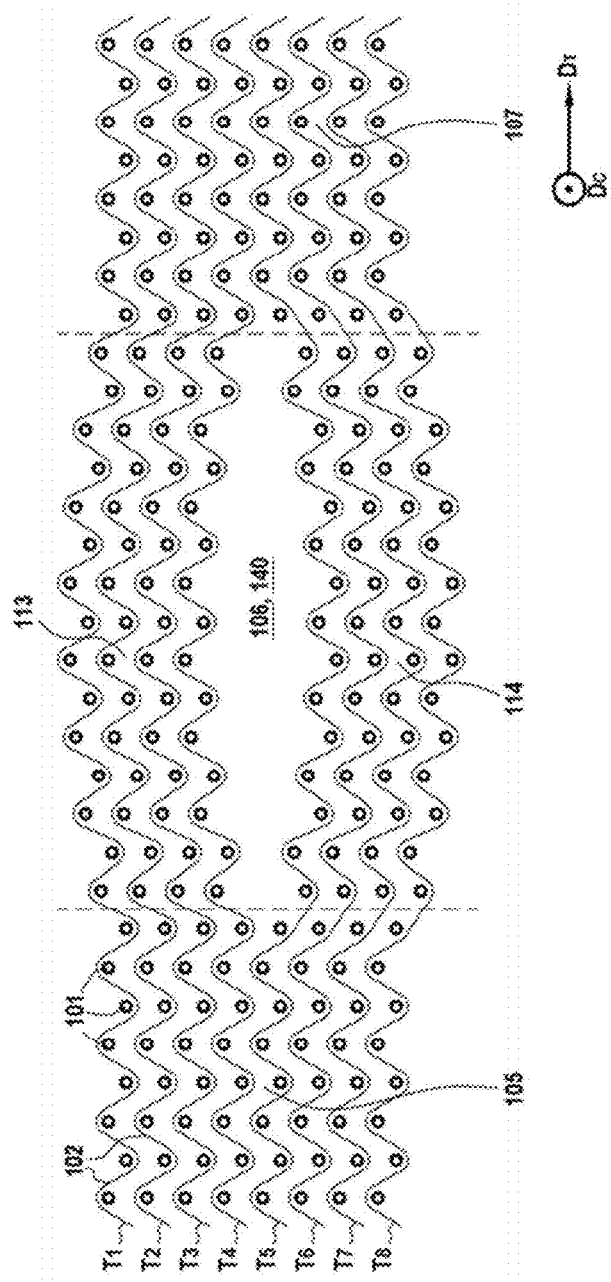

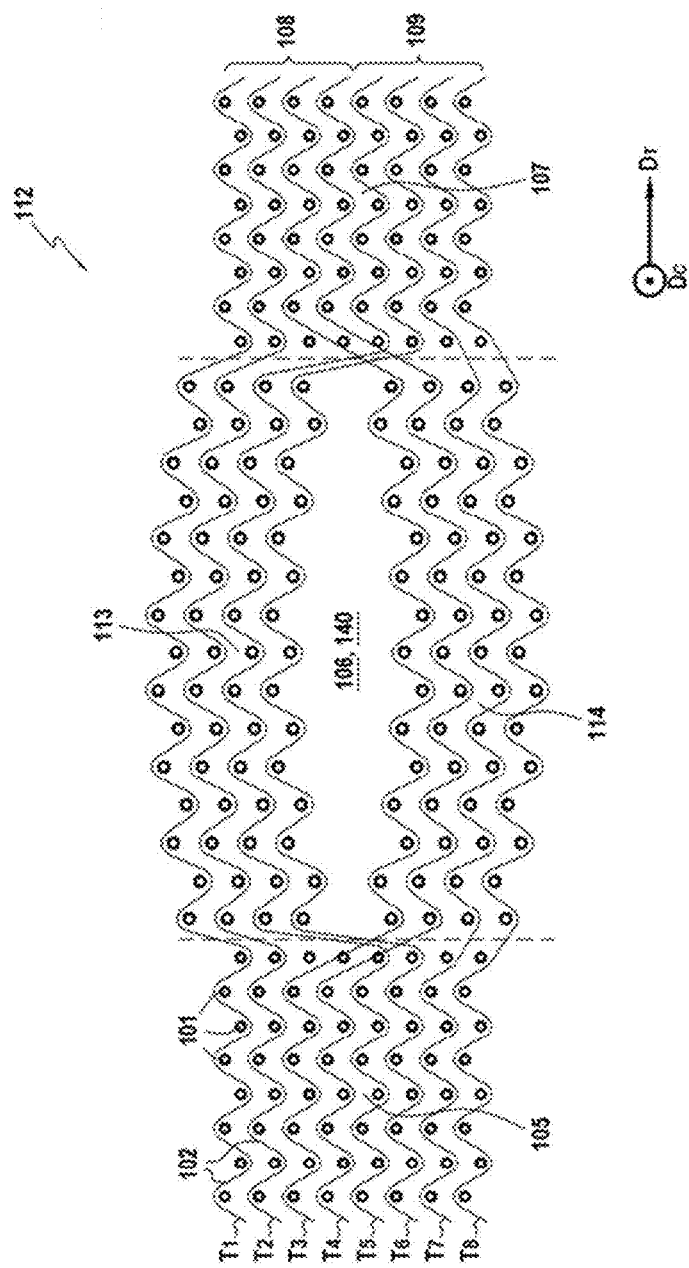

[Fig. 4]
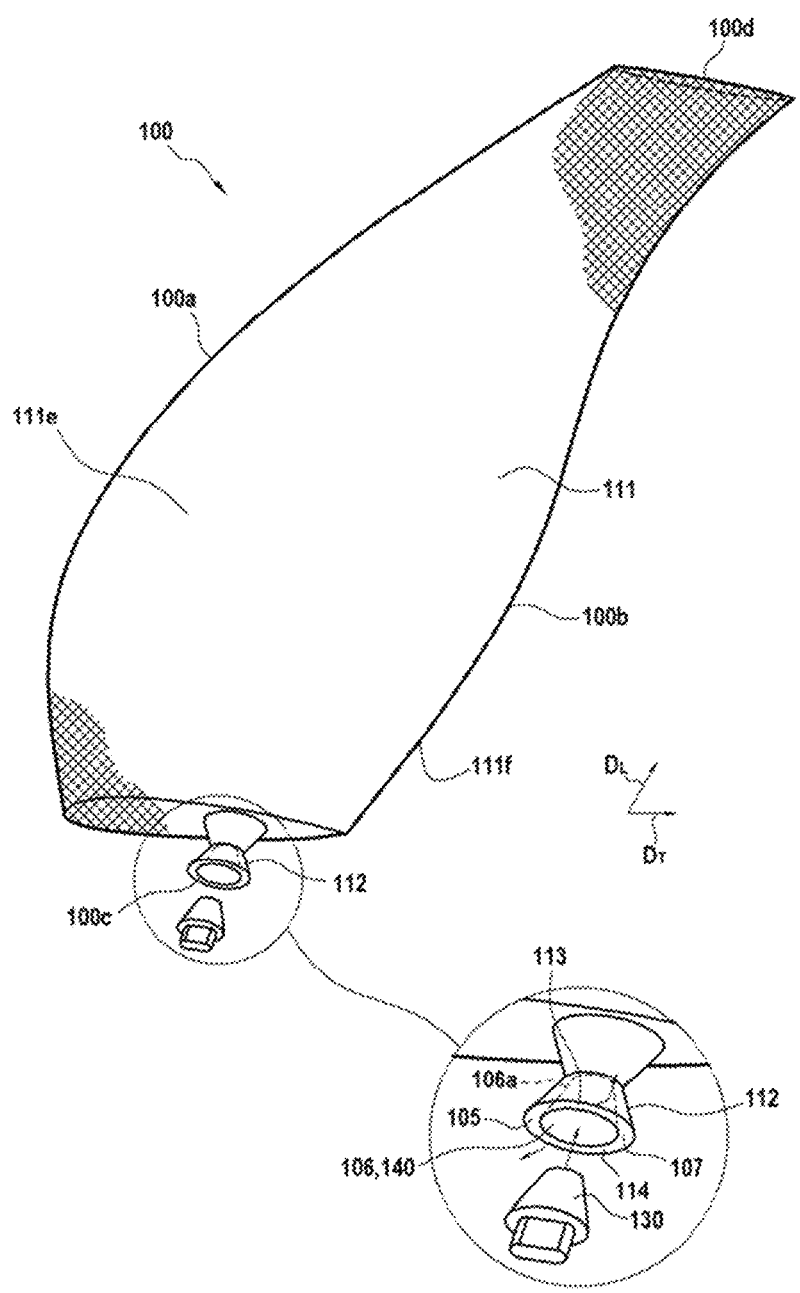

[Fig. 5]
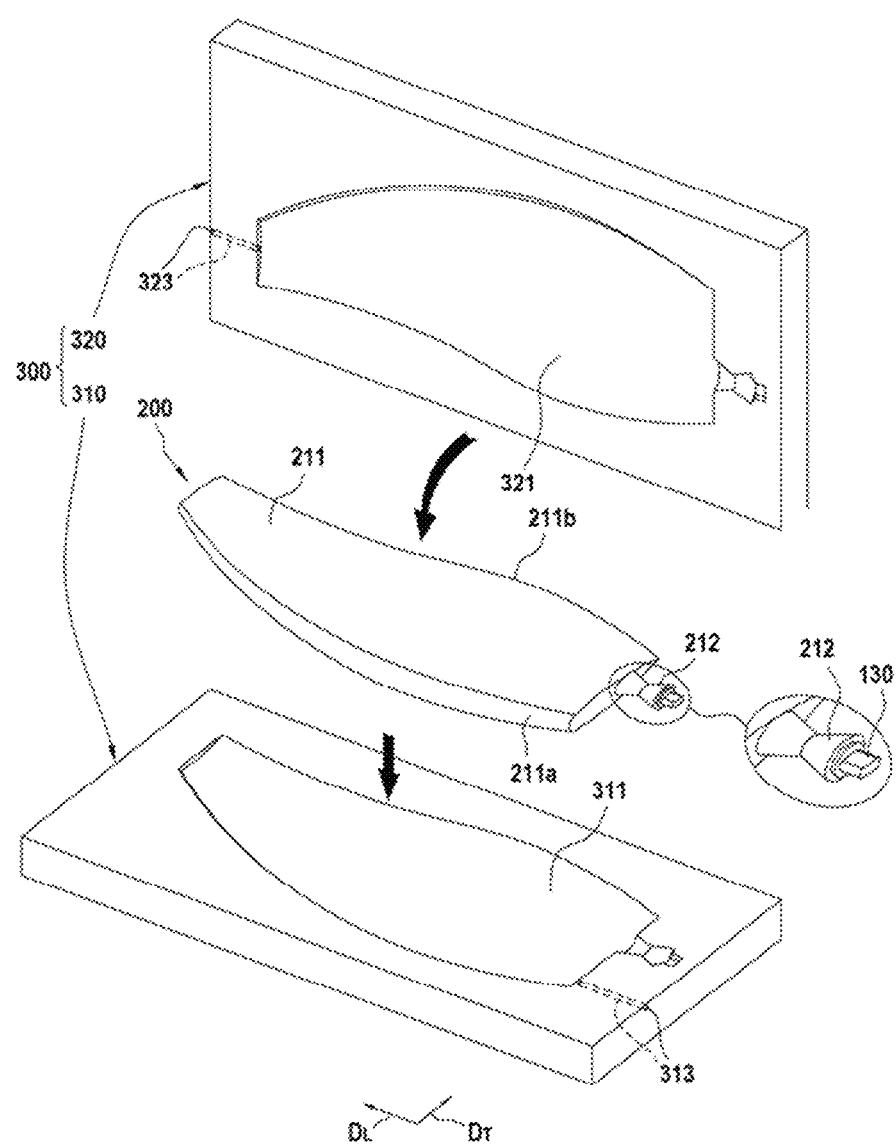

[Fig. 6]
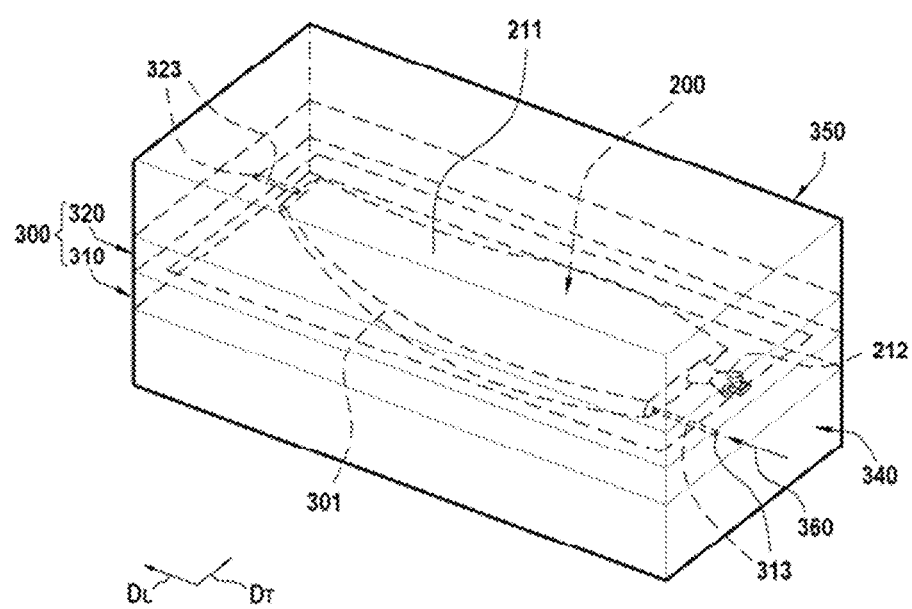

[Fig. 7]
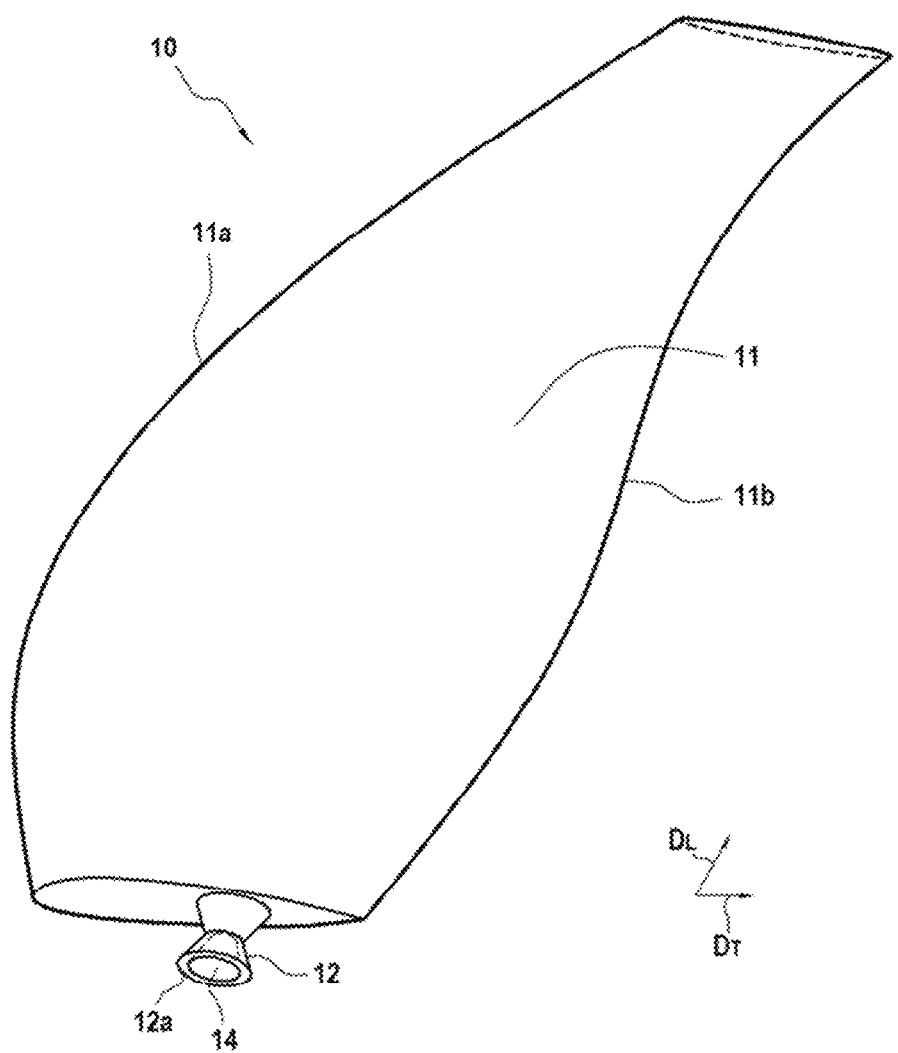

[Fig. 8]
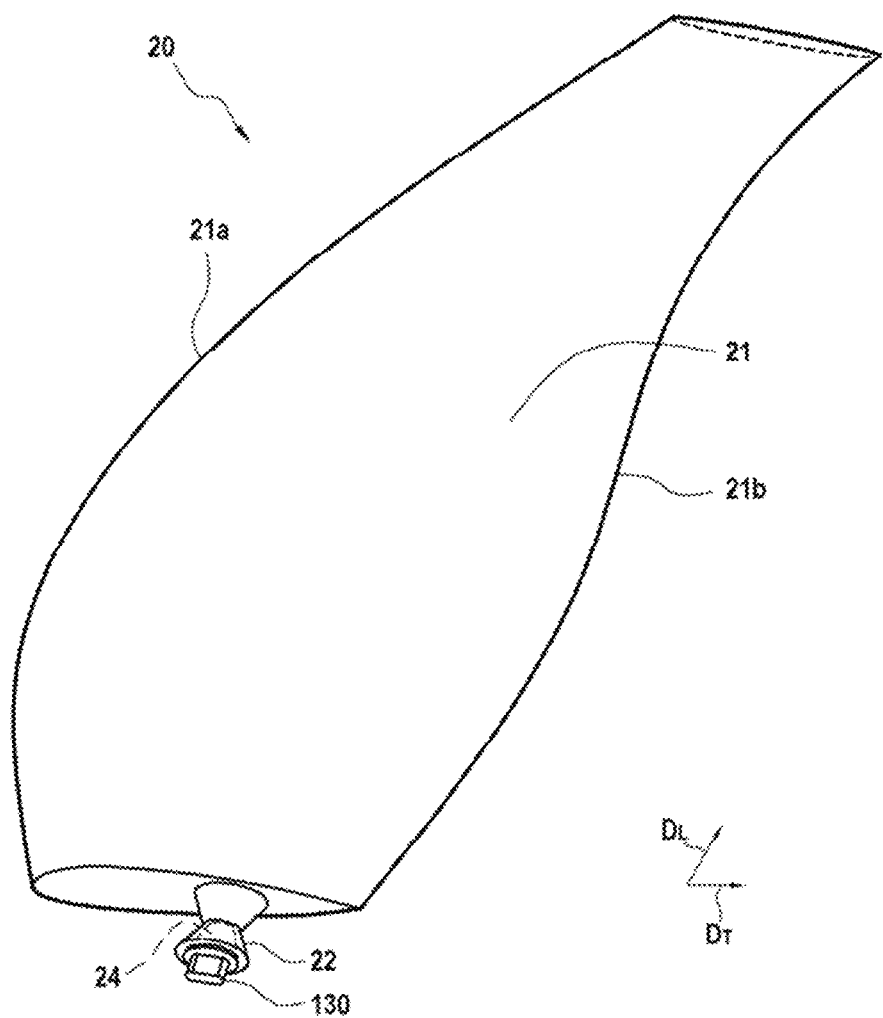

[Fig. 9]
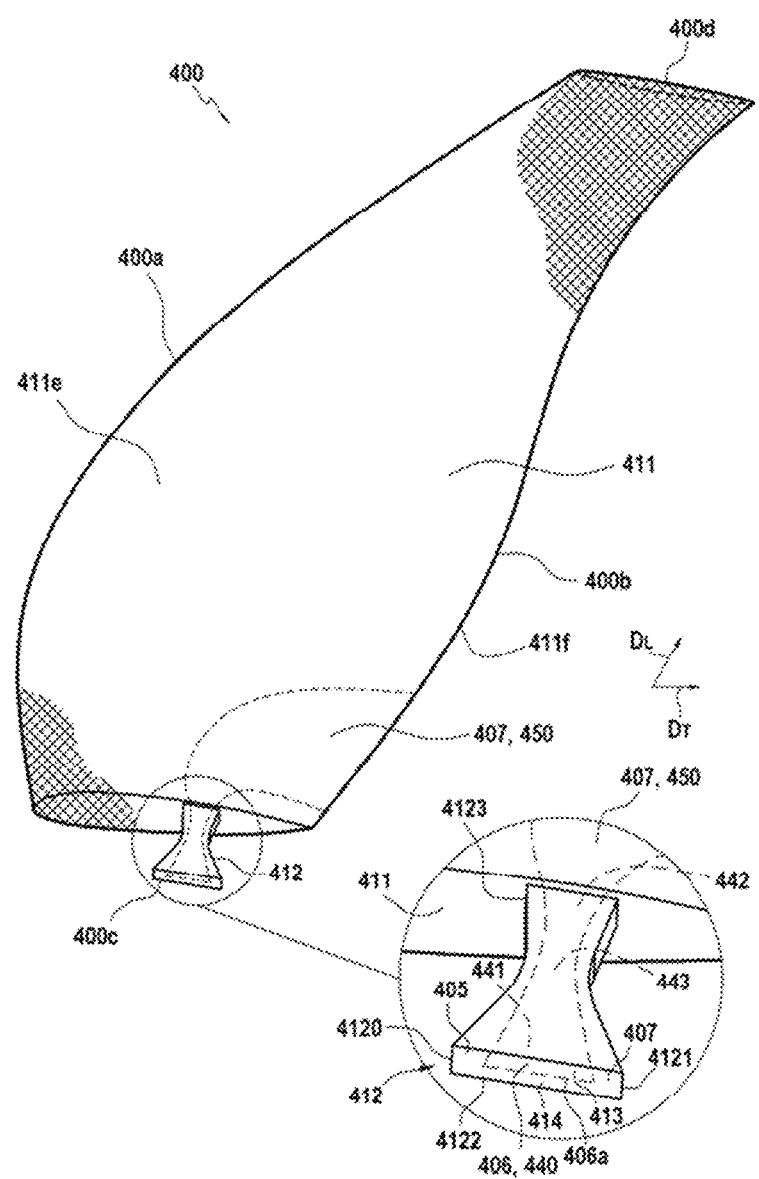

[Fig. 10]
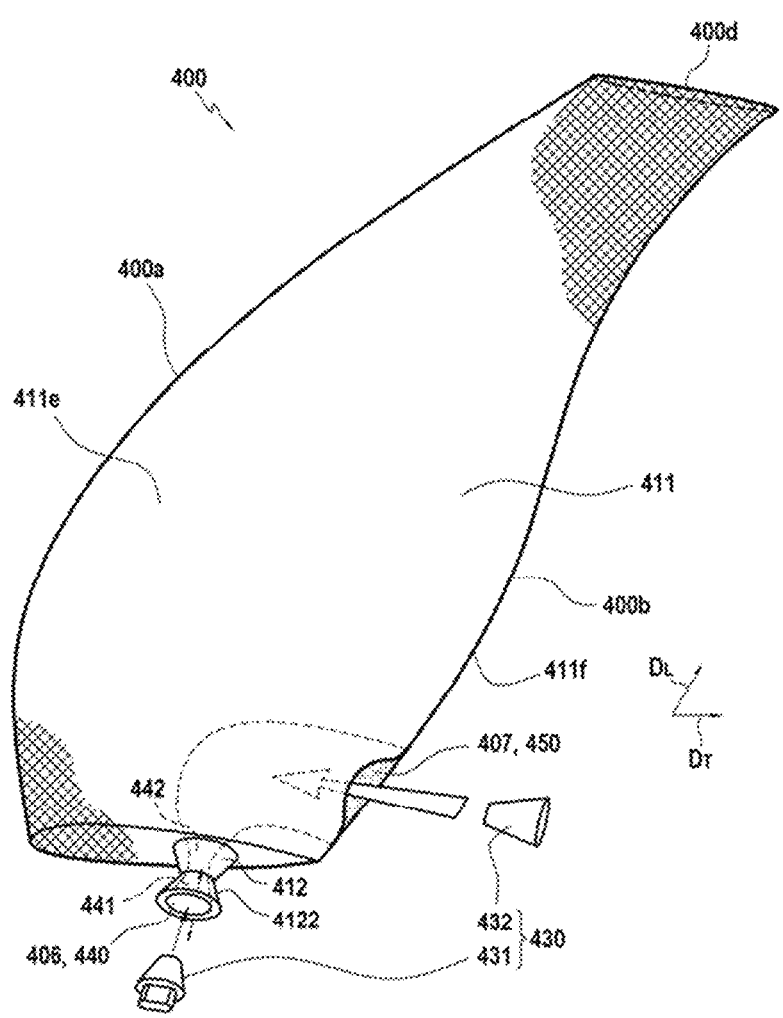

[Fig. 11]
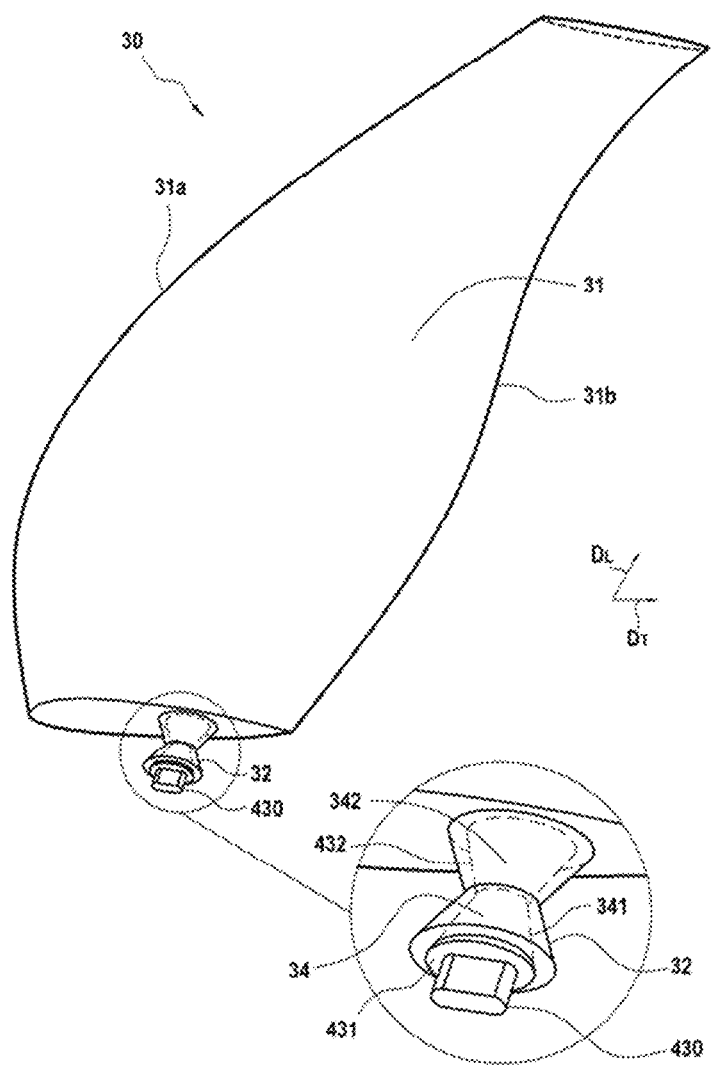

PROPELLER BLADE OR AIRFOIL WITH HOLLOW COMPOSITE ROOT

CROSS-REFERENCE TO RELATED APPLICATIONS

This application is the U.S. National Stage of PCT/FR2023/000054, filed Apr. 25, 2023, which in turn claims priority to French patent application number 2203868 filed Apr. 26, 2022. The content of these applications are incorporated herein by reference in their entireties.

TECHNICAL FIELD

The present invention relates to the field of propeller blades or airfoils for aircraft such as those present on turboprops.

PRIOR ART

Propeller blades or airfoils for turboprops are generally made of metallic material. Although the propeller blades or airfoils of metallic material have good mechanical strength, they have however the disadvantage of having a relatively large mass.

In order to obtain lighter propeller blades or airfoils, it is known to use propeller airfoils of composite material, i.e. by producing structural parts with a fibrous reinforcement densified by a matrix.

Document US 2013/0017093 describes the production of a propeller airfoil based on a fibrous structure with an aerodynamic profile inside of which is introduced a portion of a spar, one end of the spar being continued by a bulging portion intended to form the root of the propeller airfoil.

The new generation of engines necessitates more compact blade or airfoil roots. This need arises from the necessity of being able to pivot the blade or the airfoil around its vertical axis in order to adapt its incidence to the flight regime (variable pitch blade or airfoil). This need, combined with the fact that the blade or the airfoil must be integrated as low as possible on the disk, imposes strongly reducing the bulk of the root.

To this end, the roots of the new generation blades or airfoils have an axisymmetrical shape as well as reduced dimensions, unlike the roots of the prior art like those described in document US 2013/0017093, which extend over the entire width of the lower portion of the blade or airfoil.

This axisymmetrical or quasi-axisymmetrical shape is more difficult to manufacture of composite material, in particular when three-dimensional (3D) weaving is used to form the fibrous reinforcement of the blade or the airfoil.

Moreover, the mechanical loads to which the new generation roots are subjected impose additional stresses. In fact, in addition to the mechanical traction and bending loads usually encountered (caused respectively by centrifugal forces and impacts with objects), the new-generation roots can be integrated into the rotor disk by means of metal shells, which causes an additional mechanical load in circumferential compression.

DISCLOSURE OF THE INVENTION

It is therefore desirable to be able to propose a solution for the production of aircraft propeller blades or airfoils of composite material with a compact root that is able to resist the different mechanical loads.

To this end, the present invention proposes a manufacturing method for a propeller blade or airfoil for a turboprop engine, of composite material, comprising a fibrous reinforcement densified by a matrix, the method comprising:

producing a one-piece fibrous blank by three-dimensional weaving, the fibrous blank having a flat shape extending in a longitudinal direction and a transverse direction corresponding respectively to the span direction and to the chord direction of the propeller blade or airfoil to be manufactured, the fibrous blank comprising a root portion and an aerodynamic profile portion extending in the longitudinal direction from the root portion and in the transverse direction between a leading edge portion and a trailing edge portion.

forming the fibrous portion for obtaining a one-piece fibrous preform having said aerodynamic profile portion forming an aerodynamic profile preform and said root portion forming a root preform, and densifying the preform with a matrix for obtaining a propeller blade or airfoil, of composite material, having a fibrous reinforcement consisting of the fibrous preform and densified by the matrix, and forming a single part with integrated root, characterized in that the root portion of the fibrous blank comprises an unlinked area delimiting an internal root recess opening at a free end of said root portion and extending in the longitudinal direction, and in that the forming of the fibrous blank comprises the positioning of at least one insertion element in the internal root recess so as to form a bulb-shaped root preform portion.

The method of the invention thus allows producing a propeller blade or an airfoil with a composite root which is both compact and perfectly suitable for resisting the different mechanical loads described previously. In fact, the fibrous reinforcement portion of the root is produced by 3D weaving and has a bulb shape which is connected to the fibrous reinforcement portion of the aerodynamic profile at its center or elsewhere. A composite root is thus obtained which is much more compact that that of the prior art and which generally extends over the entire width of the lower portion of the aerodynamic profile. In this composite root, there are yarns, for example warp yarns, oriented in the span direction of the blade or of the airfoil which confer upon it good mechanical strength in traction and in bending by combination with the 3D weave. In addition, in the composite root, there are yarns, for example weft yarns, oriented in the direction of the chord of the blade or of the airfoil, which confer upon it good mechanical strength in circumferential compression.

Moreover, the bulb shape allows obtaining a root having an axisymmetrical or quasi-axisymmetrical shape compatible with integration into a propeller rotation or pitch change system.

By thus creating a fibrous reinforcement in which a root portion is integrally formed, i.e. woven in a single piece, with an aerodynamic profile portion, very good mechanical strength of the part is ensured and, in particular, at the connection between the root and the aerodynamic profile.

According to one embodiment of the method of the invention, the densification of the preform comprises the placement of the fibrous preform into injection tooling having the shape of the propeller blade or airfoil to be manufactured, the densification also comprising the injection of a resin into the fibrous preform held in the injection tooling, the transformation of the resin into a matrix by thermal treatment and the removal of the propeller blade or airfoil from the mold, the removal from the mold comprising the withdrawal of said at least one insertion element so as to obtain a hollow root.

According to another embodiment of the method of the invention, the densification of the preform comprises the placement of the fibrous preform into injection tooling having the shape of the propeller blade or airfoil to be manufactured, the densification also comprising the injection of a resin into the fibrous preform held in the injection tooling, the transformation of the resin into a matrix by thermal treatment and the removal of the propeller blade or airfoil from the mold so as to obtain a root comprising a cavity with said at least one injection element glued inside said cavity.

According to one aspect of the method of the invention, a lower portion of the aerodynamic profile portion of the fibrous blank comprises an unlinked area delimiting a passage between one edge of said aerodynamic profile portion and the internal root recess, said internal root recess including, in the longitudinal direction, a first portion the cross section of which decreases between the free end of the root portion and an intermediate portion of the recess and a second portion the cross section of which increases between said intermediate portion and the aerodynamic profile portion, a first portion of the insertion element, having a flared shape, being positioned in the first portion of the internal root recess, a second portion of the insertion element having a flared shape being positioned in the second portion of the internal root recess via the passage present in the aerodynamic profile portion.

According to another aspect of the invention, the insertion element is constituted from one of the following materials: metallic material, resin and salt.

The invention also has as its object a propeller blade or airfoil of a turboprop of composite material comprising a fibrous reinforcement densified by a matrix, the propeller blade or airfoil including, in a span direction, a root and an aerodynamic profile, the fibrous reinforcement comprising a fibrous preform having a three-dimensional weave with a root preform portion present in the root and an aerodynamic preform portion present in the aerodynamic profile, the root and aerodynamic profile preform portions being linked to one another by the three-dimensional weave, characterized in that the root preform portion of the fibrous preform comprises an unlinked area delimiting an internal root recess forming a cavity opening at a free end of the root.

According to one aspect of the propeller blade or airfoil of the invention, it also comprises at least one insertion element glued inside the cavity present in the root of the propeller blade or airfoil.

According to one aspect of the propeller blade or airfoil of the invention, the cavity of the root includes, in the span direction, a first portion, the cross section of which decreases between the free end of the root and an intermediate portion of the recess, and a second portion, the cross section of which increases between said intermediate portion and the aerodynamic profile, a first portion of the insertion element, having a flared shape, being present in the first portion of the cavity, a second portion of the insertion element, having a flared shape, being present in the second portion of the cavity.

The invention also covers an aeronautical engine comprising a plurality of propeller blades or airfoils according to the invention as well as an aircraft comprising at least one such engine.

BRIEF DESCRIPTION OF THE DRAWINGS

FIG. 1 is a schematic view illustrating the 3D weaving of a fibrous blank for the manufacture of a blade, FIG. 2 is an enlarged scale section view in the weft direction of an set of yarn layers showing the formation of two unlinked areas in the root portion of the blank of FIG. 1 in a section plane II-II, FIG. 3 is an enlarged scale section view in the weft direction of an set of yarn layers showing the formation of two unlinked areas in the root portion of the blank of FIG. 1 in a section plane III-III, FIG. 4 is a schematic perspective view showing the forming of a root preform portion in the fibrous blank of FIG. 1, FIG. 5 is a schematic exploded perspective view showing injection tooling and the placement of the fibrous preform inside it in conformity with one embodiment of the invention, FIG. 6 is a schematic perspective view showing the closed injection tooling of FIG. 5, FIG. 7 is a schematic perspective view of a composite material blade obtained in conformity with one embodiment of the invention, FIG. 8 is a schematic perspective view of a blade of composite material obtained in conformity with another embodiment of the invention, FIG. 9 is a schematic perspective view of a fibrous blank in conformity with another embodiment of the invention, FIG. 10 is a schematic perspective view showing the forming of the fibrous blank of FIG. 9, FIG. 11 is a schematic perspective view of a blade of composite material obtained in conformity with another embodiment of the invention.

DESCRIPTION OF THE EMBODIMENTS

The invention applies generally to different types of propeller blades or airfoils used in aircraft engines. The invention finds advantageous but not exclusive application in propeller blades or airfoils of large dimensions which are intended to be integrated into pivoting or variable pitch systems. Such propeller blades or airfoils are generally provided with a root having both a small bulk (compact shape) and good resistance with respect to traction, bending and circumferential compression forces. The blade according to the invention can in particular constitute a blade for shrouded movable wheels such as fan blades or a blade for unshrouded movable wheels, such as in aeronautical engines called "open rotor."

In the continuation of the description, the exemplary embodiments are described in relation with blades for a turboprop. However, the exemplary embodiments also apply to propeller blades for aircraft.

FIG. 1 shows very schematically a fibrous blank 100 intended to form the fibrous preform of a blade to be produced.

The fibrous structure blank 100 is obtained, as illustrated schematically in FIG. 1, by three-dimensional (3D) weaving accomplished in known fashion by means of a loom of the jacquard type on which has been arranged a cluster of warp yarns 101 or strands with a plurality of layers of hundreds of yarns each, the warp yarns being linked by weft yarns 102. The fibrous structure blank 100 is woven in a single piece, the blank extending in a longitudinal direction $D_L$, corresponding to the span direction of the blade to be manufactured, between a lower portion 100c and an upper portion 100d and in a transverse direction $D_T$, corresponding to the chord direction of the blade to be manufactured, between a front edge 100a and a rear edge 100b, the blank comprising an aerodynamic profile portion 111, defining two faces 111e and 111f intended to form respectively the upper and lower faces of the blade, and a root portion 112 intended to subsequently form a blade root and extending outside the blank of the aerodynamic profile 111 in the longitudinal direction $D_L$ and recessed from the front and rear edge 100a and 100b in the transverse direction $D_T$.

In the example illustrated, the 3D weave is an "interlock" weave. What is meant here by an "interlock" weave is a weaving pattern in which each layer of weft yarns links several layers of warp yarns with all the yarns of the same weft column having the same movement in the plane of the pattern.

Other known types of three-dimensional weaving could be used, as in particular those described in document WO 2006/136755, the content of which is incorporated here by reference. This document describes in particular the production by weaving, on one piece, of fibrous reinforcement structures for parts such as blades having a first type of pattern in the core and a second type of pattern in the skin which allow conferring both the mechanical and aerodynamic properties expected for this type of part.

The fibrous blank according to the invention can be woven in particular from yarns of carbon or ceramic fibers such as silicon carbide.

During the progress of the weaving of the fibrous blank, the thickness and width of which vary, a certain number of warp yarns are not woven, which allows defining the desired continuously variable contour and thickness of the blank 100. One example of evolving 3D weaving allowing in particular varying the thickness of the blank between a first edge intended to form the leading edge and a second edge with a smaller thickness and intended to form the trailing edge is described in document US 2006/257260.

In conformity with the invention, during weaving, an unlinked area 106 is produced inside the root portion 112 the fibrous blank 100 between two successive layers of warp yarns. The unlinked area 106 extends in a plane parallel to the surface of the fibrous blank and over an unlinked zone delimited by a contour 106a locally separating the root portion 112 into two woven portions 113 and 114. In addition, the unlinked area 106 extend in the transverse direction between a first lateral edge 1120 and a second lateral edge 1121 and recessed from these edges (i.e. the unlinked area 106 does not open onto the lateral edges 1120 and 1121) so as to retain the linking portions 105 and 107, adjacent respectively to the first and second lateral edges 1120 and 1121. The unlinked area 106 also opens at the lower free end 1122 of the root portion 112. The unlinked area 106 thus forms an internal recess 140 in the root portion 112 which is accessible by the lower free end 1122.

One 3D weaving mode with an interlock pattern of the blank 100 is shown schematically by FIG. 2. FIG. 2 is a partial enlarged view of a warp section plane and a portion of the blank 100 including the unlinked zone 106 (section II-II in FIG. 1). In this example, the blank 100 comprises 8 layers of warp yarns 101 extending substantially in the longitudinal direction $D_L$. In FIG. 2, the 8 layers of warp yarns are linked by weft yarns $T_1$ to $T_8$ in the linking zones 105 and 107 of the root portion 112 of the fibrous blank 100, the weft yarns extending substantially in the transverse direction $D_T$. At the unlinked area 106, the woven portion 113 comprises 4 layers of warp yarns 101 linked together by 4 weft yarns $T_1$ to $T_4$, while the woven portion 114 comprises the 4 layers of warp yarns forming the set of yarn layers 109 are linked by the 4 weft yarns $T_5$ to $T_8$.

In other words, the fact that the weft yarns $T_1$ to $T_4$ do not extend into the layers of warp yarns of the woven portion 114 and that the weft yarns $T_5$ to $T_8$ do not extend into the layers of warp yarns of the woven portion 113 provides the unlinked area 106 which separates the woven portions 113 and 114.

In the weaving example presented in FIG. 2, the weft yarns $T_1$ to $T_4$, on the one hand, and the weft yarns $T_5$ to $T_8$, on the other hand, are respectively arranged on each side of the unlinked area 106, the weft yarns $T_1$ to $T_4$ linking the four first layers of warp yarns forming the woven portion 113 and the weft yarns $T_5$ to $T_8$ linking the four last layers of warp yarns forming the woven portion 114.

According to a variant embodiment illustrated in FIG. 3 (section III-III in FIG. 1), a first portion of the yarns of the layers of weft yarns intersects with a second portion of the yarns of the layers of weft yarns in a zone of the fibrous blank 100 located in the vicinity of unlinked area 106 in the transverse direction $D_T$, the yarns of the first portion of weft yarns 102 extending on one side of the unlinked are 106 in the transverse direction $D_T$ while the yarns of the second portion of yarns of the plurality of layers of warp yarns 102 extend on the other side of the unlinked area 106 in the transverse direction $D_T$. More precisely, one or more weft yarns 102 linking layers of warp yarns forming a set of yarn layers 108 in the linking zone 105 are used to link layers of warp yarns forming a set of yarn layers 109 in the linking zones 107, and conversely. In the example illustrated in FIG. 3, the weft yarns $T_3$ and $T_4$, linking layers of warp yarns 101 of the set of yarn layers 108 in the first linking zone 105 are deflected at the beginning or upstream of the unlinked area 106 in the transverse direction $D_T$ to link layers of warp yarns 101 of the set of yarn layers 109. Likewise, the weft yarns $T_5$ and $T_6$, linking layers of warp yarns 101 of the set of yarn layers 109 in the first linking zone 105 are deflected at the beginning or upstream of the unlinked area 106 in the transverse direction $D_T$ to link layers of warp yarns 101 of the set of yarn layers 108. After the unlinked area 106, the weft yarns $T_3$ and $T_4$ are again deflected at the end or downstream of the unlinked area 106 in the transverse direction $D_T$, i.e. at the entry into the second linking zone 107, to link layers of warp yarns 101 of the set of yarn layers 109 while the weft yarns $T_5$ and $T_6$ are again deflected at the end of downstream of the unlinked area 106 in the transverse direction $D_T$, i.e. at their entry into the second linking zone 107, to link layers of warp yarns 101 of the set of yarn layers 108. The intersection of the weft yarns $T_3$ and $T_4$ and of the weft yarns $T_5$ and $T_6$ upstream and/or downstream of the unlinked area 106 in the transverse direction $D_T$ allows improving the strength of the fibrous blank in the unlinked zone. According to a variant embodiment, a portion of the weft yarns can intersect one another only upstream or downstream of the unlinked area 106 in the transverse direction $D_T$.

Once the weaving is completed, the non-woven yarns present around the fibrous blank 100 are cut away to extract the blank, then the forming of the blank root portion is undertaken. In the example described here, the forming of the root portion 112 is accomplished by separating the woven portions 113 and 114 and by introducing an insertion element 130 into the internal recess 140 formed by the unlinked area 106, as illustrated in FIG. 4. The insertion element can in particular be produced of metallic material or of resin by additive manufacture, for example. It can also be accomplished with a salt which can be dissolved after densification.

A fibrous preform 200 is thus obtained, comprising in the longitudinal direction $D_L$ an aerodynamic profile preform portion 211 and a bulb-shaped root preform portion 212 with an internal recess 240 comprising the insertion element 130 as shown in FIG. 5. The aerodynamic profile preform portion 211 extending in the transverse direction $D_T$ between a leading edge portion 211a and a trailing edge portion 211b.

The densification of the fibrous preform is then undertaken. The densification of the fibrous preform intended to form the fibrous reinforcement of the part to be manufactured consists of filling the porosity of the preform, in all or part of its volume, with the material constituting the matrix. This densification is accomplished in a fashion known per se using the liquid path method (CVL). The liquid path method consists of impregnating the preform with a liquid composition containing a precursor of the matrix material. The precursor usually appears in the form of a polymer, such as a high-performance epoxy resin, possibly diluted in a solvent. The preform is placed in a mold which can be closed in a sealed manner, with a recess having the shape of the final molded blade. Then the mold is closed and the liquid matrix precursor (a resin for example) is injected into the entire recess to impregnate the entire fibrous portion of the preform.

The transformation of the precursor into a matrix, namely its polymerization, is accomplished by thermal treatment, generally by heating the mold, after elimination of a possible solvent and cross-linking of the polymer, the preform always being held in the mold having a shape corresponding to that of the part to be produced.

In the case of the formation of a carbon or ceramic matrix, the thermal treatment consists of pyrolizing the precursor to transform the matrix into a carbon or ceramic matrix depending on the precursor used and the pyrolysis conditions. By way of an example, liquid ceramic precursors, particularly of SiC, can be resins of the polycarbosilane (PCS) type, or polytitanocarbosilane (PTCS) or polysilazane (PSZ), while liquid carbon precursors can be resins with a relatively high coking rate, such as phenolic resins. Several consecutive cycles, from impregnation to thermal treatment, can be accomplished to reach the desired degree of densification.

According to one aspect of the invention, in the case in particular of the formation of an organic matrix, the densification of the fibrous preform can be accomplished by the well-known method of transfer molding called RTM ("Resin Transfer Molding"). In conformity with the RTM method, the fibrous preform is placed in a mold having the external shape of the part to be produced. A thermosetting resin is injected into the internal volume of the mold which comprises the fibrous preform. A pressure gradient is generally established in this internal volume between the location where the resin is injected and the openings for draining the latter in order to control and to optimize the impregnation of the preform by the resin.

As illustrated in FIG. 5, the injection of a liquid matrix precursor composition into the fibrous texture as well as its transformation into a matrix are accomplished here in injection tooling 300 which comprises a first shell 310 comprising at its center a first indentation 311 corresponding in part to the shape and to the dimensions of the blade to be produced, and a second shell 320 comprising at its center a second impression 321 corresponding in part to the shape and to the dimensions of the blade to be produced.

Once the tooling 300 is closed as illustrated in FIG. 6, the first and second indentations 311 and 321, respectively of the first and second shells 310 and 320, define together an internal volume 301 having the shape of the blade to be produced and in which is placed the fibrous preform 200. Compacting the preform 200 can be accomplished with the closure of the tooling 300 in order to obtain a predetermined fiber content in the preform. In this case, compacting pressure is applied to the shells 310 and 320, by means of a press for example. The compacting of the fibrous preform can also be accomplished in separate tooling before the introduction of the preform into the injection tooling.

The tooling 300 also comprises means allowing accomplishing the injection of a liquid matrix precursor and the transformation of this precursor into a matrix. More precisely, in the example described here, the first shell 310 of the tooling 300 comprises an injection port 313 intended to allow the injection of a liquid matrix precursor composition into the fibrous preform while the second shell comprises a drainage port 323 intended to cooperate with a pumping system for placing the tooling under vacuum and withdrawing air during the injection. The injection tooling 300 also comprises a lower portion 340 and an upper portion 350 between which the first and second shells 310 and 320 are placed, the lower portion 340 and the upper portion 350 being equipped with heating means (not shown in FIG. 6).

Once the tooling 300 is closed, the molding of the blade is undertaken by impregnating the preform 200 with a thermosetting resin that is polymerized by thermal treatment. To this end, the well-known injection or transfer molding method, called RTM ("Resin Transfer Molding") is used. In conformity with the RTM method, a resin 360, for example a thermosetting resin, is injected via the injection port 313 of the first shell 310, into the internal volume occupied by the preform 200. The port 323 of the second shell 320 is connected to a drainage line held under pressure (not shown in FIG. 6). This configuration allows establishing a pressure gradient between the lower portion of the preform 200 where the resin is injected, and the upper portion of the preform located in proximity to the port 323. In this manner, the resin 360 injected substantially at the lower portion of the preform will progressively impregnate the entire preform by circulating within it until the drainage port 323 through which the surplus is drained. Of course, the first and second shells 310 and 320 of the tooling 300 can comprise respectively several injection ports and several drainage ports.

The resin can for example be an epoxy resin of the 180° C. temperature (maximum temperature endured without loss of characteristics) class. Resins suitable for RTM methods are well known. They preferably have a low viscosity to facilitate their injection into the fibers. The selection of the temperature class and/or the chemical nature of the resin is determined depending on the thermomechanical loads to which the part must be subjected. Once the resin is injected into the entire reinforcement, its polymerization is undertaken by thermal treatment in conformity with the RTM method.

After the injection and the polymerization, the blade is removed from the mold. The insertion element 130 is then withdrawn so as to obtain a hollow blade root. Finally, the blade is trimmed to remove excess resin and the chamfers are machined. No other machining is necessary because, the part being molded, it satisfies the required dimensions.

The densification methods described earlier allow producing, based on the fibrous preform of the invention, mainly propeller blades or airfoils of organic matrix (CMO), carbon matrix (C/C) and ceramic matrix (CMC) composite material.

As illustrated in FIG. 7, a blade 10 is obtained formed from a fibrous reinforcement densified by a matrix which includes in its lower portion a root 12 formed by the root preform portion 212 of the fibrous preform 200 and an airfoil 11 formed by the airfoil preform portion 211 of the fibrous preform 200. The blade 10 includes a leading edge 11a and a trailing edge 11b, corresponding respectively to the leading edge 211a and trailing edge 211b portions of the fibrous preform 200. The root 12 comprises a cavity 14 formed by the internal recess 240 of the fibrous preform 200, the cavity 14 opening at the free end 12a of the root 12. The blade 10 thus comprises a root 12 which has a compact axisymmetrical shape suitable for integration into a propeller rotation or pitch change system.

According to a variant embodiment, the insertion element 130 is retained after removal from the mold. In this case, as illustrated in FIG. 8, a blade 20 is obtained, formed from a fibrous reinforcement densified by a matrix which includes, in its lower portion, a root 22 formed by the root preform portion 212 of the fibrous preform 200 and an airfoil 21 formed by the airfoil preform portion 211 of the fibrous preform 200. The blade 20 comprises a leading edge 21a and a trailing edge 21b corresponding respectively to the leading edge 211a and trailing edge 211b portions of the fibrous preform 200. The root 22 comprises a cavity 24 formed by the internal recess 240 of the fibrous preform 200, the insertion element 130 being glued inside said cavity 24. The blade 20 thus comprises a root 22 which has a compact axisymmetrical shape suitable for integration into a propeller rotation or pitch change system.

FIG. 9 illustrates a fibrous blade blank 400 according to another embodiment. The fibrous blank 400 is produced by 3D weaving under the same conditions as the blank 100 previously described. The fibrous blank 400 differs from the fibrous blank 100 already described in that the internal root recess delimited by the unlinked area has an "hourglass" or "diabolo" geometry into which it is not possible to introduce an insertion element with a shape corresponding in part to the only opening present at the free end in the root portion of the fibrous blank. To this end, an insertion element in two parts is used, while the fibrous blank comprises an additional unlinked area allowing the introduction of one of the two parts of the insertion element.

More precisely, the fibrous blank 400 extends in a longitudinal direction $D_L$, corresponding to the span direction of the blade to be manufactured, between a lower portion 400c and an upper portion 400d, and in a transverse direction $D_T$, corresponding to the chord direction of the blade to be manufactured between a front edge 400a and a rear edge 400b, the blank comprising an aerodynamic profile portion 411 defining two faces 411e and 411f intended to form respectively the upper and lower faces of the blade, and a root portion 412 intended to subsequently form a blade root and extending inside the aerodynamic profile blank 411 in the longitudinal direction $D_L$ and recessed from the front and rear edges 400a and 400b in the transverse direction $D_T$.

In conformity with the invention, during weaving, a first unlinked area 406 is produced inside the root portion 412 the fibrous blank 400 between two successive layers of warp yarns. The unlinked area 406 extends in a plane parallel to the surface of the fibrous blank and over an unlinked zone delimited by a contour 406a locally separating the root portion 412 into two woven portions 413 and 414. In addition, the unlinked area 406 extends in the transverse direction between a first lateral edge 4120 and a second lateral edge 4121 and recessed from these edges so as to retain the linking portions 405 and 407 adjacent respectively to the first and second lateral edges 4120 and 4121. The unlinked area 406 also opens at the lower free end 4122 of the root portion 412.

The width of the unlinked area 406 varies between the lower free end 4122 of the root portion and the end 4123 of the root portion opposite to the end 4122 in the longitudinal direction $D_L$. Here the unlinked area 406 delimits an internal recess 440 which includes, in the longitudinal direction $D_L$, a first portion 441 the cross section of which decreases between the free end 4122 of the root portion 412 and an intermediate part 443 of the internal recess 440, and a second portion 442 the cross section of which increases between the intermediate portion 443 and the aerodynamic profile portion 411. The first portion 441 of the internal recess 440 is accessible by the lower free end 4122.

An additional unlinked area 407 delimiting a passage 450 between one edge, here the edge 400b of the aerodynamic profile portion 411 and the internal recess 440 in the root portion 412. The second portion 442 of the internal recess 440 is accessible by the passage 450.

In FIG. 10, the forming of the root portion of the fibrous blank is accomplished by introducing a first portion 431 of an insertion element 430 with a flared shape into the first portion 441 of the internal recess 440 through the lower free end 4122, on the one hand, and by introducing a second portion 432 of the insertion element 430 into the second portion 442 of the internal recess 440 through the passage 450.

Once the fibrous preform is thus produced, it is placed in injection tooling in order to form there a matrix as previously explained in detail, and which is not described again here for the sake of simplification.

What is then obtained, as illustrated in FIG. 11, is a blade 30 formed from a fibrous reinforcement densified by a matrix which includes in its lower portion a root 32 formed by the root preform portion of the fibrous preform and an airfoil 31 formed by the airfoil preform portion of the fibrous preform. The blade 30 includes a leading edge 31a and a trailing edge 31b corresponding respectively to the leading edge and trailing edge portions of the fibrous preform. The root 32 comprises a cavity 34 formed by the internal housing 440 of the fibrous preform 400, the cavity 34 comprising the insertion element 430 glued inside said cavity 34, the first portion 431 of the insertion element 430, with a flared shape, being present and glued in a first portion 341 of the cavity 34 corresponding to the first portion 441 of the internal recess 440 while the second portion 432 of the insertion element 430 is present and glued in a second portion 342 of the cavity 34 corresponding to the second portion 442 of the internal recess 440. The first and second portion 431 and 432 of the insertion element 430 can also be glued at their contact interface. The blade 30 thus comprises a root 32 which has a compact axisymmetrical shape suitable for integration into a propeller rotation or pitch change system.

The forming of the aerodynamic profile of the fibrous blanks previously described can comprise the insertion of one or more forming parts into one or more unlinked areas produced in the aerodynamic profile. The forming part(s) preferably consist of a light rigid material with a low density such as a rigid honeycomb material.

The invention claimed is:

1. A manufacturing method for a propeller blade or airfoil for a turboprop engine, of composite material, comprising a fibrous reinforcement densified by a matrix, the method comprising:

producing a one-piece fibrous blank by three-dimensional weaving, the fibrous blank having a flat shape extending in a longitudinal direction and a transverse direction corresponding respectively to a span direction and to a chord direction of the propeller blade or airfoil to be manufactured, the fibrous blank comprising a root portion and an aerodynamic profile portion extending in the longitudinal direction from the root portion and in the transverse direction between a leading edge portion and a trailing edge portion, forming the fibrous blank for obtaining a one-piece fibrous preform having said aerodynamic profile portion forming an aerodynamic profile preform portion and said root portion forming a root preform portion, and densifying the fibrous preform with a matrix for obtaining a propeller blade or airfoil, of composite material, having a fibrous reinforcement consisting of the fibrous preform and densified by the matrix, and forming a single part with integrated root, wherein the root portion of the fibrous blank comprises an unlinked area delimiting an internal root recess opening at a free end of said root portion and extending in the longitudinal direction, said unlinked area extending in the transverse direction between a first lateral edge and a second lateral edge and recessed from said first and second lateral edges, and wherein the forming of the fibrous blank comprises a positioning of at least one insertion element in the internal root recess so as to form a bulb-shaped root preform portion, and wherein the root preform portion extends, in the span direction of the propeller blade or airfoil, outside the aerodynamic profile preform portion from a bottom end of said aerodynamic profile preform portion and recessed, in the chord direction of the propeller blade or airfoil, from the leading edge portion and the trailing edge portion of said aerodynamic profile preform portion.

2. The method according to claim 1, wherein the densifying of the fibrous preform comprises a placement of the fibrous preform into injection tooling having a shape of the propeller blade or airfoil to be manufactured, the densifying also comprising injection of a resin into the fibrous preform held in the injection tooling, transformation of the resin into a matrix by thermal treatment and removal of the propeller blade or airfoil from the mold, the removal from the mold comprising removal of said at least one insertion element so as to obtain a hollow root.

3. The method according to claim 1, wherein the densifying of the fibrous preform comprises a placement of the fibrous preform into injection tooling having a shape of the propeller blade or airfoil to be manufactured, the densifying also comprising injection of a resin into the fibrous preform held in the injection tooling, transformation of the resin into a matrix by thermal treatment and removal of the propeller blade or airfoil from the mold so as to obtain a root comprising a cavity, with said at least one insertion element glued inside said cavity.

4. The method according to claim 3, wherein a lower portion of the aerodynamic profile portion of the fibrous blank comprises an unlinked area delimiting a passage between one edge of said aerodynamic profile portion and the internal root recess, said internal root recess including, in the longitudinal direction, a first portion, the cross section of which decreases between the free end of the root portion and an intermediate portion of the recess and a second portion, the cross section of which increases between said intermediate portion and the aerodynamic profile portion, a first portion of the at least one insertion element, having a flared shape, being positioned in the first portion of the internal root recess, a second portion of the at least one insertion element having a flared shape being positioned in the second portion of the internal root recess via the passage present in the aerodynamic profile portion.

5. The method according to claim 3, wherein the at least one insertion element is constituted of one of the following materials: metallic material, resin and salt.

6. A propeller blade or airfoil, of a turboprop engine, of composite material comprising a fibrous reinforcement densified by a matrix, the propeller blade or airfoil including, in a span direction, a root and an aerodynamic profile, the fibrous reinforcement comprising a fibrous preform having a three-dimensional weave with a root preform portion present in the root and an aerodynamic profile preform portion present in the aerodynamic profile, the root preform portion extending, in the span direction of the propeller blade or airfoil, outside the aerodynamic profile preform portion from a bottom end of said aerodynamic profile preform portion and recessed, in a chord direction of the propeller blade or airfoil, from a leading edge portion and a trailing edge portion of said aerodynamic profile preform portion, the root and aerodynamic profile preform portions being linked to one another by the three-dimensional weave, wherein the root preform portion of the fibrous preform comprises an unlinked area delimiting an internal root recess forming a cavity opening at a free end of the root, the unlinked area extending in a transverse direction between a first and a second linking portion.

7. The propeller blade or airfoil according to claim 6, further comprising at least one insertion element glued inside the cavity present in the root of the propeller blade or airfoil.

8. The propeller blade or airfoil according to claim 6, wherein the cavity of the root includes, in the span direction, a first portion having a cross section of which decreases between the free end of the root and an intermediate portion of the recess, and a second portion having a cross section of which increases between said intermediate portion and the aerodynamic profile, a first portion of the insertion element, having a flared shape in the first portion of the cavity, a second portion of the insertion element, having a flared shape in the second portion of said cavity.

9. An aeronautical engine comprising a plurality of propeller blades or airfoils according to claim 6.

10. An aircraft comprising at least one engine according to claim 9.

11. The propeller blade or airfoil of claim 6, wherein the cavity formed by the unlinked area comprises, in the span direction, a first portion having a decreasing cross section from a free end of the root to an intermediate portion, and a second portion having an increasing cross section from said intermediate portion to the aerodynamic profile preform portion.

* * * * *